Oct. 29, 1946.  J. L. CREAGMILE  2,410,339
WHEEL ALIGNMENT GAUGE
Filed Feb. 15, 1943  3 Sheets-Sheet 1
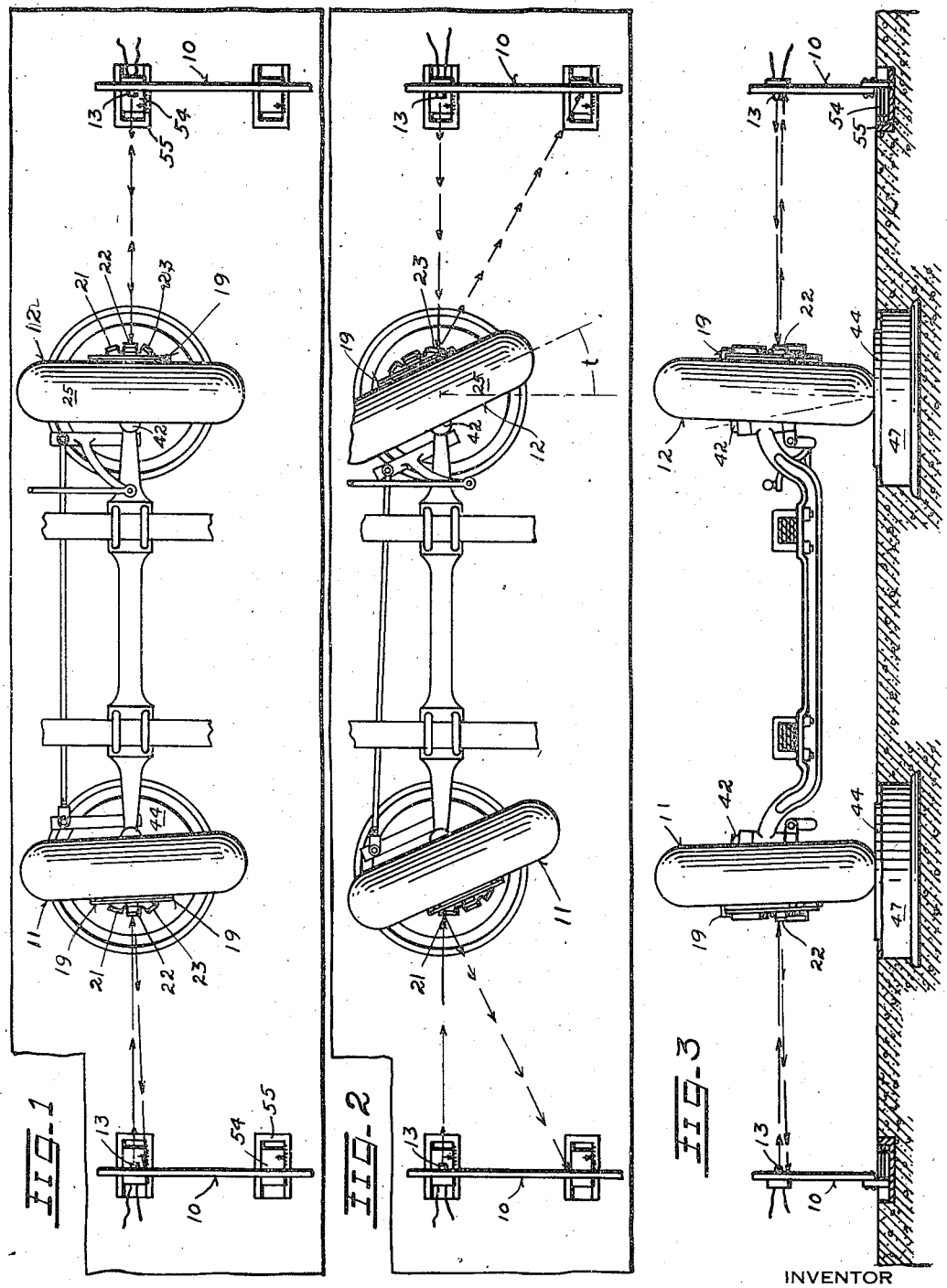
INVENTOR
JOHN L. CREAGMILE
BY Henry N. Young
ATTORNEY

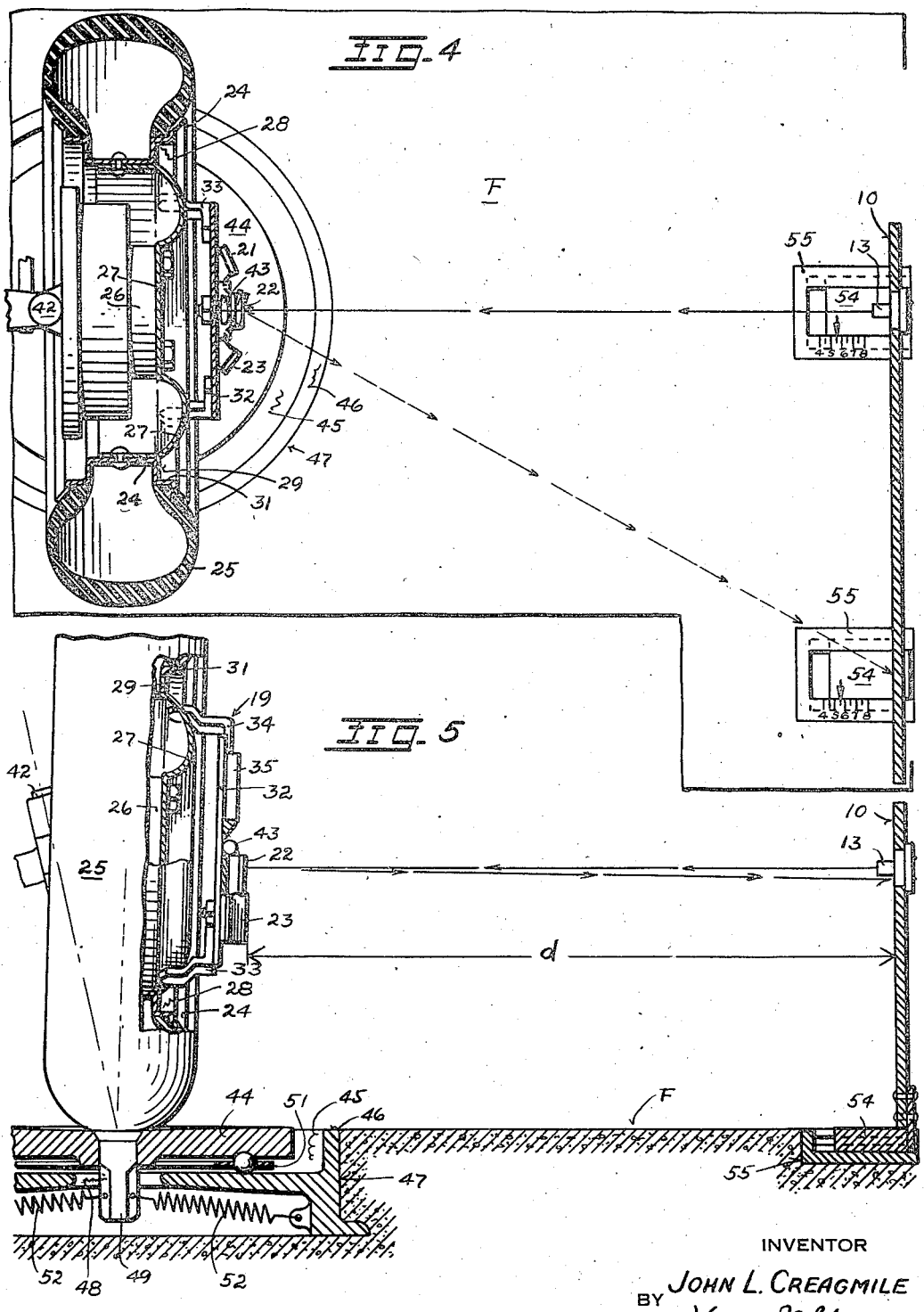

Oct. 29, 1946.  J. L. CREAGMILE  2,410,339
WHEEL ALIGNMENT GAUGE
Filed Feb. 15, 1943  3 Sheets-Sheet 3
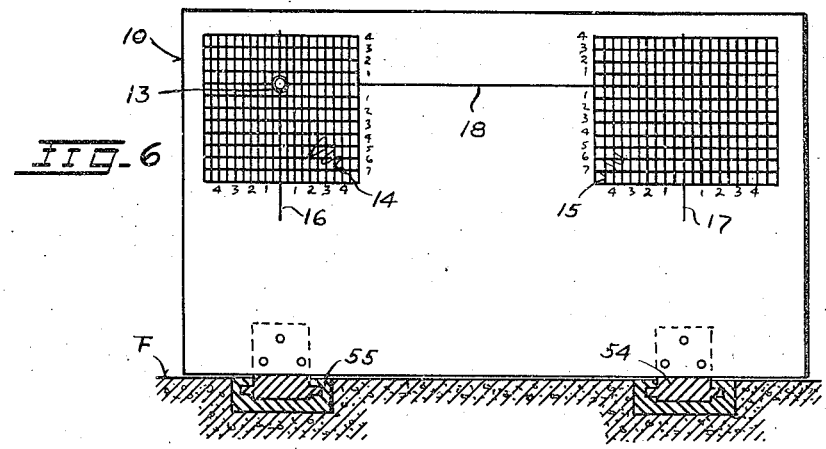
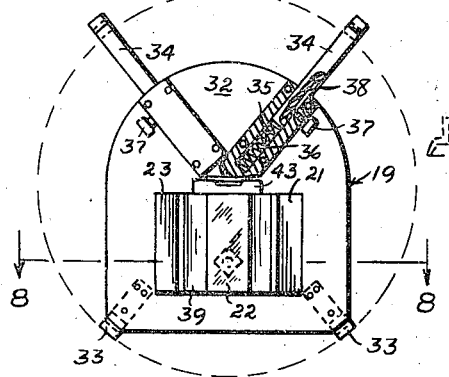
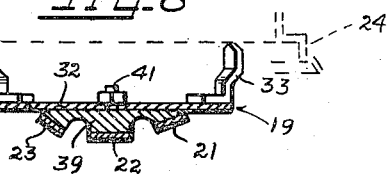
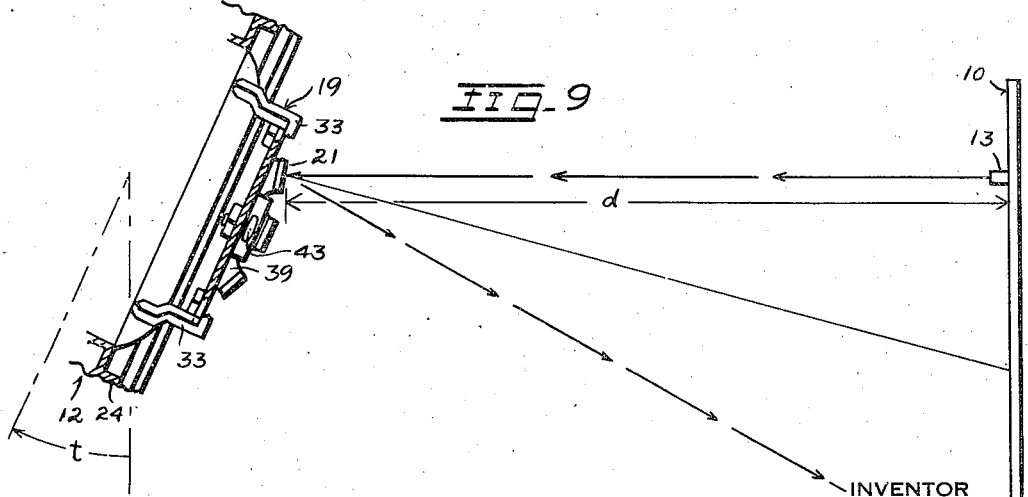
INVENTOR
JOHN L. CREAGMILE
BY Henry N. Young
ATTORNEY Patented Oct. 29, 1946

2,410,339

UNITED STATES PATENT OFFICE 2,410,339

WHEEL ALIGNMENT GAUGE

John L. Creagmile, Oakland, Calif.

Application February 15, 1943, Serial No. 475,945

4 Claims. (Cl. 88—74)

The invention relates to a means for gauging various alignment relations of dirigible wheels of vehicles.

The general object of the invention is to provide an improved and particularly simple device for gauging such features as the camber, caster, toe-in, and turning radius of the dirigible wheels of vehicles while the wheels are mounted on the vehicles.

A more specific object is to provide a particularly simple and effective device for utilizing a beam of light in effecting the aforesaid gauging operations, the device comprising an optical means.

A further object is to provide a simple and effective means for mounting a reflector of the apparatus upon wheels being gauged for their alignment relations.

The invention possesses other objects and features of advantage, some of which, with the foregoing, will be set forth or be apparent in the following description of a typical embodiment of the invention, and in the accompanying drawings, in which, Figure 1 is a fragmentary plan view illustrating the method of using the present apparatus for gauging the toe-in and camber of a pair of dirigible wheels of a motor vehicle.

Figure 2 is a fragmentary plan view showing the apparatus in use for gauging the caster and turning radius relations of the wheels.

Figure 3 is a front elevation of the assembly of the Figures 1 and 2, the wheels being set in straight-ahead position with respect to the vehicle.

Figure 4 is an enlarged plan section of the left-side wheel and associated gauging apparatus shown in Figure 1, the section being taken generally at the central diametrical plane of the wheel.

Figure 5 is a front sectional elevation of the combination of Figure 4 taken generally at a fixed beam line provided by the apparatus.

Figure 6 is a full-face elevation of a gauging screen comprising part of the apparatus.

Figure 7 is an outside elevation of a bracket for mounting reflectors of the apparatus on a wheel.

Figure 8 is a sectional view taken at the line 8—8 in Figure 7.

Figure 9 is a fragmentary plan view at the scale of Figure 4, and shows the functioning of the gauging apparatus for a predetermined right-turn wheel position.

Essentially, the optical gauging apparatus of my invention includes complementary screen members 10 fixedly positioned opposite and outwardly of the laterally spaced dirigible wheels 11 and 12 of a vehicle having its said wheels supported for their steering swinging about fixed points, suitable light sources 13 for directing light beams horizontally toward the wheels in a common line which lies in a vertical plane through or immediately adjacent the support points of the wheels and complementary reflector sets removably mounted upon the different wheels in definite relations thereto and having reflectors thereof arranged to be selectively interposed in the beam lines in accordance with the dispositions of the wheels to reflect the intercepted beams upon scales provided on the opposed faces of the corresponding screens 10.

Each present screen member 10 mounts a light source 13, and has its graduated face perpendicular to the light beam from the light source and provided with scales 14 and 15 at different calibrated zones of said face. The scale 14 is provided adjacent and about the unitary beam source 13 for its use in toe-in and camber measurements, and the scale 15 is positioned forwardly of the scale 14 for its use in castor and turning-radius determinations. The scale 14 has an intermediate vertical zero line 16 intersecting the beam line, the scale 15 has an intermediate vertical zero line 17, and the scales 14 and 15 have a common horizontal zero line 18 intersecting the beam line. The scales 14 and 15 may be calibrated for angle degrees with respect to the various zero lines thereof, or the lines of the calibrations may be arbitrarily numbered for reference. In either case, it will be understood that the actual determinations made for a vehicle having its wheel alignment under investigation with the present apparatus are compared with the values intended for the wheels by the vehicle manufacturer.

The beam sources 13 comprise any suitable unitary devices for providing the beams, and may, for instance, include electric lamps enclosed in suitable housings from which the beams are projected as pencils of light of uniform or slightly contracting cross-section, as by the action of lenses and/or reflectors in the housings; the use of an electric lamp as a source of light for a present beam is assumed in the present apparatus. The details of the beam sources 13 are not shown, as they are aside from the scope of the present features of invention.

Bracket assemblies 19 are provided for mounting the sets of reflectors on the different wheels 11 and 12 in predetermined relation thereto, each reflector set comprising a rear reflector 21 and an intermediate reflector 22 and a front reflector 23 in mutually fixed unitary relation to the supporting bracket. Each mounted reflector 22 has its reflecting face fixed in parallel relation to the plane of the wheel which mounts it whereby, when the wheel is in straight-ahead position, the horizontally projected light beam from the opposed light source 13 will be reflected from the reflector upon the screen 10 at a point in the vertical zero line 16 of the scale 14. It will thus be understood that a straight-ahead setting of the wheel is readily and accurately effected merely by so disposing the wheel that the beam reflected from the reflector 22 strikes a point of the vertical zero line 16 of the scale 14.

Because of camber, the point at which a light beam reflected from a reflector 22 strikes the opposed screen 10 should be below the horizontal zero line 18 of the scales 14 and 15 by an amount which represents the angle of camber for the wheel mounting the reflector, said angle being the slope of the wheel-mounting spindle when the wheel is in a straight-ahead position, as is assumed for the wheel 12 in Figures 1 and 3. For measuring camber, it is merely necessary to so set a wheel which is to be gauged for camber that the beam reflected from the reflector 22 mounted on it strikes a point in the vertical zero line 16 of the scale 14, with the location of said point with respect to the horizontal zero line 18 of the scale 14 comprising a direct camber determination; a measurement of the camber angle for the wheel 12 is indicated in Figure 3.

Recalling that the two dirigible wheels of a motor vehicle for highway travel are connected for simultaneous swinging in steering the vehicle, the setting of one wheel in true straight-ahead position should, because of toe-in, cause a horizontally angular reflection of the beam from the reflector 22 of the other wheel to strike the opposed screen 10 at a point of its scale 14 which is forward of the vertical zero line 16 of the scale, it being understood that the turn angle of the second wheel thus measured horizontally actually comprises the sum of the toe-in angles for the wheels, and may be considered as twice the toe-in angle for either wheel for gauging purposes. A measurement of toe-in is indicated in Figure 1, with the wheel 12 in straight-ahead position and the total toe-in reading for both wheels arranged to be taken at the scale 14 opposite the wheel 11.

It will now be noted that the reflectors 21 and 23 are provided both for measuring simultaneous differences in the angles of turning of the wheels from straight-ahead positions thereof and for measuring changes in the angularity of the turned wheels with respect to the vertical, the measurements being respectively made with reference to the vertical zero line 17 of the scale 15 and to the horizontal zero line 18 of the scales 14 and 15. With particular reference to the scales 15, the vertical zero lines 17 thereof are arbitrarily and correspondingly positioned on the screen 10 to represent a fixed and predetermined turn angle $t$ for the wheels, said angle $t$ being twenty-five degrees in the present instance. For reasons which are hereinafter brought out, the planes of the reflecting faces of the reflectors 21 and 23 intersect the plane of the reflecting face of the associated reflector 22 in lines which are mutually parallel and are disposed in a vertical plane including the bearing point of the wheel during a reading on a scale 15. Figure 2 shows an angle $t$ left-turn setting for the left wheel 12, while Figure 9 shows an angle $t$ right-turn setting for said wheel.

For caster determinations with the present apparatus, one wheel is set in either a left-turn or right-turn position with the light beam reflected from a reflector 21 or 23 striking the opposed screen 10 to provide a reading at a point of the vertical zero line 17 of its scale 15. The latter scale reading provides a caster determination when referred to the horizontal zero line 18 of the scale in comparison with the camber reading from the reflector 22 with respect to the same zero line, provided the line of intersection of the reflecting faces of the reflectors used is in a vertical plane including the point of support of the wheel carrying the reflectors. The two readings thus obtained with respect to the zero line 18 are, for instance, those obtained from the reflectors 22 and 23 when the left wheel 12 is respectively disposed in the different positions shown for it in Figures 1 and 2, it being understood that caster determinations are made individually for the different wheels.

For turning-radius determinations, one wheel is set in turn position as for a caster determination, and the point at which the light beam reflected from the reflector 21 or 23 of the second wheel strikes the opposed scale 15 supplies a turning-radius determination when referred to the vertical zero line 17 of the scale. In this manner, the difference in the angles of turning of the two wheels is ascertained as a turning-radius determination. As particularly shown in Figure 2, the wheels 11 and 12 are both disposed in left turn positions, and with the wheel 12 assumed to be set for the striking of the beam reflected from the forward reflector 23 on the opposed scale 15 at a point in the vertical zero line 17 of said scale; under these circumstances, the left-turn angle for the wheel 11 should be less than the angle through which the wheel 12 has been turned from straight-ahead, it being recalled that the proper alignment relations of the dirigible wheels of a land vehicle require that the axes of rotation of both wheels intersect the same vertical line in a vertical plane through the axial line of the non-dirigible wheels when the dirigible wheels are set for a turning of the vehicle from a straight-ahead line.

The support brackets 19 are arranged for removable mounting directly on a usual wheel rim 24 which mounts a pneumatic tire 25 on a wheel hub structure 26. In the present wheel structure, the rim 24 is fixedly mounted on a cylindrical peripheral portion of a disc 27 which is bolted to the outer end of the hub structure. The rim 24 is provided with usual circumferential right-angle inside corners or grooves 28 at its opposite sides, said corners each being defined by flat radial rim portions 29 and cylindrical rim portions 31 at the outer edges of the portions 29, and the means for mounting the sets of reflectors on the wheels utilizes said corners at the outer wheel faces.

Each present bracket 19 comprises a base plate member 32 provided with suitable arms arranged to have their extremities cooperatively engage the rim corner 28 at the outer wheel side for mounting the plate on the rim. As shown, the plate 32 is generally rectangular, and has one-piece arms 33 fixed at adjacent corners thereof and having their extremities arranged for fitted engagement in the rim corner 28. At opposite sides of the plate 32 from the arms 33, the plate 32 slidably mounts arms 34 having their free extremities also arranged for engagement in a rim corner 28, said arms being shown as mounted in guide sockets 35 from which their extension is constantly urged by the action of springs 36 engaged between the opposed inner ends of the sockets and of the slidable arms. The inner ends of set-screws 37 mounted in a side of each socket 35 engage slots 38 provided in the opposed sides of the arms 34, said slots terminating short of the inner arm ends whereby the inner slot ends may coact with the set-screws 37 to limit the extension of the arms from the sockets under the influence of the springs 36. The arrangement is such that a plate 32 may be firmly and accurately mounted on a wheel rim 24 in exact parallel relation to the plane of the rim and wheel by engaging the appropriately formed extremities of the arms 33 and 34 in the corner 28 in simultaneous engagement with the corner sides 29 and 31. The arrangement also provides for the mounting of a plate 32 on rims of different sizes in the usual range of size for such rims, it being noted that the rim-engaging portions of the various arms 33 and 34 are offset from the plane of the plate 32 to dispose the mounted plate clear of the wheel portion at the side of a wheel which is to mount it.

The reflectors 21 and 22 and 23 of a set are mounted on a block 39 which is fixed by means of a bolt 41 against the outer side of the plate 32 to dispose the reflector 22 in parallel relation to the wheel plane, the various present reflectors being rectangular. In the present structure, the reflectors 21 and 23 are in such angular relation to the reflector 22 that the forward screen scales 15 may be used for gauging readings with either left-turn or right-turn wheel settings. While the screens 10 might extend rearwardly of the beam sources 13 to provide the scales 15, or provide scales 15 both forwardly and rearwardly for the projection thereupon of beams reflected from the mirrors 21 and 23, the disclosed position of the scales 15 for use in measuring turn positions and caster effects is generally the most practical as best providing for the simultaneous visibility of both scales of both screens to an operator positioned in front of the vehicle.

It will now be noted that the gauging use of the turn-measuring reflectors 21 and 23 requires a particular positioning of these reflectors because of the fact that straight-ahead and turn readings obtained from different reflectors are to be compared as a gauging means. If the wheels 11 and 12 had neither camber nor caster, the disposal of reflectors 21 and 23 to vertically position the parallel intersection lines of the planes of their reflection faces with that of the reflector face of the associated reflector 22 would provide readings solely along the scale zero line 18 of the opposed screen as true angularity measures with respect to straight-ahead wheel positions. Actually, because of camber and caster, said intersection lines of the reflection faces of the reflectors, while parallel to the wheel plane, must be out of the vertical in vertical planes including the bearing point of the wheel, said bearing point lying substantially in the axis of the king pin 42 about which the wheel is swung in turning. Accordingly, means are provided for setting the reflectors as described and required, said means in the present case comprising a level bubble 43 mounted on each block 39 and having its longitudinal line perpendicular to the aforesaid intersection lines of the flat reflector faces of the three reflectors of the set whereby the rotation of the carrying wheel to level the bubble about the wheel axis, which comprises the leveling line of the bubble, will position the reflectors as required for a proper reading; a rotary resetting of the reflectors by use of the levelling means will usually be necessary after each change in the turn angle of the wheel because of the action of the camber and caster on the angularity of the wheel with respect to the vertical.

Noting that the effective axis of swinging of the wheel is approximately a vertical axis through the bearing point of the tire 25, the reflectors 21 and 22 and 23 are preferably arranged at equal distances from said axis for an average-sized wheel rim whereby their effective distances from the opposed screen 10 may be substantially the same as the wheel is turned; because of the off-center swinging of the reflectors as the wheel is turned, the reflectors are actually spaced in an arcuate line. Also, when the disclosed brackets 19 are mounted on rims of different size, they thereby dispose a reflector assembly at different heights from the plane of support of the wheels. Since the beam line is at a fixed level, the reflectors must be of sufficient height when in position for use to provide for their described striking by and reflections of the beams for a usual range of rim and tire sizes as affecting the heights of disposal of the reflector assemblies.

While a vehicle may have its wheel alignment relations gauged with the present apparatus while supported independently of its dirigible wheels, more dependable results are obtainable if the gauging operations are effected while the vehicle is supported upon all of its wheels with the plane of support horizontal. Accordingly, I prefer to support the dirigible wheels on individual turntable assemblies. Because the bearing point of a turning dirigible wheel shifts slightly with respect to the fixed vehicle body, frictional effects on the tire at its bearing point are preferably eliminated by permitting a lateral shifting of the tire-engaging turntable member with the point. As brought out in Figure 5, each turntable assembly comprises a disc 44 having a slightly cupped upper face rotatably mounted in a circular depression 45 of somewhat greater diameter than the disc provided in the top 46 of a hollow base member 47 set into a support floor F to dispose the upper disc face in flush relation with the upper floor face.

The present base top 46 is provided with a circular central opening 48 to freely receive a stem 49 depending integrally from the disc, the size of the opening determining a permitted lateral shifting of the disc from its centered position in the base recess. A flat anti-friction bearing ring 51 is operatively disposed between the disc 44 and the bottom of the depression 45 for supporting the disc upon the base for its lateral shifting, and tension springs 52 radiating from the stem 49 to points of attachment with the side walls of the base cavity constantly and yieldingly urge a rotative and lateral centering of the disc in the depression 45, it being understood that the mutual spacing of the discs 44 designed to simultaneously support the two dirigible wheels of a motor vehicle is the same as the spacing of the bearing points of the wheels when the vehicle is travelling straight ahead.

It will now be noted that wheel rims 24 of different diameters frequently have different widths at the rim grooves 28, such widths increasing generally with the rim diameters, whereby the spacing of an operative reflector of a mounted reflector assembly from the opposed screen 10 will vary and so change the significance of the graduations of the scales 14 and 15 unless the reflector and screen are relatively adjustable for providing the same spacing of the reflectors and screens for all rim widths. While means might be provided for axially adjusting the mirror-carrying block 39 on the bracket 19, I prefer to adjust the screens 10 as required for maintaining the latter at the distance $d$ from the reflectors for which the graduations of the scales 14 and 15 have been provided, it being recalled that the three reflectors of a set are used while arranged in a common horizontal arc such that corresponding horizontal lines of the reflectors are equally spaced from the axis of turning of a wheel having an average-sized rim. With reference to present wheel rim sizes, it is noted that the variation in widths is no more than four inches whereby the required range of relative adjustment of a reflector set with respect to the opposed screen for a fixed spacing of the reflectors and a screen is no more than two inches and may be ignored in the middle range of rim widths.

For providing the aforesaid positioning adjustment of the screens 10, as may be needed or desired, each of said screens is mounted on a pair of blocks 54 which are in turn slidably mounted in guideways extending in lines parallel to the beams from the beam sources 13 and provided in base members 55 fixedly embedded in the floor F. The tops of the blocks 54 and of the base members 55 which receive them are flush, and registering upper faces of the blocks and members are conveniently calibrated in terms of rim sizes for facilitating the setting of the screens at the desired distance $d$ from the corresponding reflectors.

Understanding that well-known and appropriate corrections are made with respect to wheels which are found to be misaligned by the use of the present gauging apparatus, it will be noted that the necessary correction adjustments or operations may be performed on the vehicle structure without dismounting the reflector assemblies or disturbing the remaining parts of the present gauging apparatus which are free of the wheels and vehicle. In this manner, the effects of correction adjustments or operations may be observed as they are made whereby to save time and avoid over-corrections.

From the foregoing description, taken in connection with the accompanying drawings, the advantages of the construction and use of the present alignment-gauging device will be readily understood by those skilled in the art to which the invention appertains. While I have described the features and use of an arrangement which I now consider to be a preferred embodiment of my invention, I desire to have it understood that the showing is primarily illustrative, and that such changes may be made, when desired, as fall within the scope of the following claims.

I claim:

1. In apparatus for gauging an alignment relation of a dirigible wheel disposed for its swinging in place about an upright axis, an optical indicating means comprising a fixed source of light emitting a light beam directed horizontally in a line toward said axis of swinging for the wheel, a reflector mounted on the wheel for its disposal to intercept said light beam for the reflection thereof and having its reflecting face parallel to the plane of the wheel, and a fixed scale disposed to intercept the reflected beam at a point in a vertical zero line of the scale intersecting the beam line when a horizontal line of said reflecting face intersected by the beam line is perpendicular to the beam line.

2. In apparatus for gauging an alignment relation of a dirigible vehicle wheel disposed for its swinging in place about an upright axis and from a straight-ahead position of the wheel with respect to the vehicle, an optical indicating means comprising a fixed source of light emitting a light beam directed horizontally toward the wheel in a line perpendicular to a horizontal line in the wheel plane when the wheel is in straight-ahead position, a flat reflector mounted on the wheel for its disposal to intercept said light beam for the reflection of the beam when the wheel is in a substantially straight-ahead position thereof and having its reflecting face parallel to the plane of the wheel, and a fixed scale disposed to intercept the reflected beam at a point in a vertical line through the beam line from the source when the wheel is in straight-ahead position, said scale having vertical and horizontal calibrations referred to said beam line from the source for the gauging of turn and/or camber angles of the wheel.

3. In apparatus for gauging an alignment relation of a dirigible vehicle wheel disposed for its swinging in place about an upright axis and with respect to a straight-ahead position of the wheel with respect to the vehicle, an optical indicating means comprising a fixed source of light emitting a light beam directed horizontally toward the wheel in a line perpendicular to a horizontal line in the wheel plane when the wheel is in straight-ahead position, a flat reflector fixedly mounted on the wheel for its disposal to intercept said light beam for the reflection of the beam when the wheel is in a substantially straight-ahead position thereof and having its reflecting face parallel to the plane of the wheel, a second flat reflector fixedly mounted on the wheel for its disposal upon an appreciable turning of the wheel from its straight-ahead position to intercept said light beam for the reflection thereof and having the plane of its reflecting face angularly related to the plane of the reflecting face of the first reflector and intersecting the latter plane in a line parallel to the plane of the wheel and arranged for its disposal during the gauging use of the reflectors in a vertical plane including the bearing point of the wheel, and a fixed scale disposed to intercept the reflected beam from the different respective reflectors when the wheel is in straight-ahead and turn positions thereof, said scale having vertical and horizontal calibrations referred to said beam line from the light source for the gauging of turn and camber angles of the wheel.

4. In apparatus for gauging an alignment relation of a dirigible vehicle wheel disposed for its swinging in place about an upright axis and for its rotative turning in place, an optical indicating means comprising a fixed source of light directing a light beam horizontally toward the wheel in a line perpendicular to a horizontal line in the wheel plane when the wheel is in straight-ahead position, a support member removably fixed on the wheel at its side toward the light source, a flat reflector fixedly carried by the support member in position thereon to intercept said light beam when the wheel is in a substantially straight-ahead position thereof and having the plane of its reflecting face parallel to the plane of the wheel, a second flat reflector fixedly mounted on the support member in position thereon to intercept said light beam upon an appreciable angular swinging of the wheel from its straight-ahead position and having the plane of its reflecting face angularly related to the plane of the reflecting face of the first reflector and intersecting the latter plane in a line parallel to the plane of the wheel, a leveling means on said support having its leveling line perpendicular to the plane of the reflecting face of the first reflector for use in rotatively adjusting the wheel to dispose said line of intersection of the reflector planes in a vertical plane including the bearing point of the wheel, and a fixed scale disposed to intersect the reflected beam from the different respective reflectors when the wheel is in straight-ahead and turn positions thereof.

JOHN L. CREAGMILE.